United States Patent [19]

Shekleton et al.

[11] Patent Number: 5,363,644
[45] Date of Patent: Nov. 15, 1994

[54] ANNULAR COMBUSTOR

[75] Inventors: Jack R. Shekleton, San Diego; William D. Treece, La Mesa, both of Calif.

[73] Assignee: Sundstrand Corporation, Rockford, Ill.

[21] Appl. No.: 455,575

[22] Filed: Dec. 21, 1989

[51] Int. Cl.$^5$ .................................................. F23R 3/50
[52] U.S. Cl. ....................................... 60/39.36; 60/760
[58] Field of Search ....................... 60/39.36, 755, 756, 60/759, 760

[56] References Cited

U.S. PATENT DOCUMENTS

| | | | |
|---|---|---|---|
| 2,651,175 | 9/1953 | Griffith | 60/39.23 |
| 3,019,606 | 2/1962 | Franz | 60/759 |
| 3,032,990 | 5/1962 | Rogers | 60/39.32 |
| 3,287,905 | 11/1966 | Bayard | 60/39.36 |
| 3,397,535 | 8/1968 | Dechaux | 60/39.5 |
| 4,297,842 | 11/1981 | Gerhold et al. | 60/39.06 |
| 4,429,527 | 2/1984 | Teets | 60/39.06 |
| 4,549,402 | 10/1985 | Saintsbury et al. | 60/738 |
| 4,674,286 | 6/1987 | Thatcher et al. | 60/740 |
| 4,794,754 | 1/1989 | Shekleton et al. | 60/39.36 |
| 4,955,201 | 9/1990 | Shekleton et al. | 60/39.36 |

Primary Examiner—Stephen C. Bentley
Attorney, Agent, or Firm—Wood, Phillips, VanSanten, Hoffman & Ertel

[57] ABSTRACT

The expense of fabricating an annular combustor (10) for a gas turbine is minimized by providing a combustor housing (12) including a generally axially extending sleeve (14) and an annular liner (18) disposed within the housing (12) and about the sleeve (14). The annular liner (18) has concentric inner and outer axially extending walls (20, 22) spaced from the sleeve (14) and the housing (12), respectively, and also has a radially extending wall (24) spaced from the housing (12) and interconnecting the inner and outer walls (20, 22) at one end to define a combustion chamber (26). The liner (18) is spaced from the housing (12) and the sleeve (14) to define a compressed air flow path (28) extending from a radially outer compressed air inlet (30) to a radially inner compressed air outlet (32) in communication with the combustion chamber (26) axially remote from the radially extending wall (24). The annular combustor (26) is provided with a plurality of air blast fuel injectors (42, 44) for injecting a fuel/air mixture into the liner (18) in a generally tangential direction adjacent the radially extending wall (24). The annular combustor (10) also includes a plurality of open ended elongated tubes (36) in the outer wall (22) adjacent the compressed air inlet (30) to provide dilution air at a point upstream of a turbine nozzle (40) and a plurality of open ended elongated tubes (34) in the outer wall (22) intermediate the dilution air tubes (36) and the radially extending wall (24) to provide air for combustion. With this arrangement, the combustion air tubes (34) are sized to admit sufficient combustion air to ensure completion of combustion upstream of the plane defined by the dilution air tubes (36) while forming a flame zone extending from a point adjacent the radially extending wall (24) to a point no further downstream than the dilution air tubes (36).

18 Claims, 2 Drawing Sheets

ANNULAR COMBUSTOR

FIELD OF THE INVENTION

The present invention is directed to an annular combustor for a gas turbine and, more particularly, to an annular combustor which may be manufactured inexpensively.

BACKGROUND OF THE INVENTION

Most relatively small missiles in use today are propelled by solid fuel rockets as opposed to, for example, turbojet engines. The selection of a solid fuel rocket as a propulsion device has been largely dictated by two factors. First, in many instances, a turbine engine cannot be fabricated sufficiently economically as to compete with a solid fuel rocket engine. Secondly, in small size missiles, i.e., those having relatively small diameter on the order of about six inches, it has heretofore been quite difficult to manufacture an efficient turbojet engine. The difficulty lies in the fact that the turbojet engine must fit within the six inch envelope required of the propulsion unit for such a missile. Unfortunately, the use of solid fuel rocket engines has had consequences that are not desirable in many applications.

Specifically, the use of solid fuel rocket engines results in the loss of some degree of control of the missile flight path or trajectory. In contrast, control is far greater with gas turbine engines whose output can readily be varied. Further, even if the gas turbine engine operates relatively inefficiently, the use of such an engine would greatly extend the range of the missile.

The difficulty in economically producing small diameter gas turbine engines resides primarily in the labor intensive nature of the manufacture of the combustor. Furthermore, as combustor sizes shrink to fit in some desired envelope, the difficulty in achieving efficient combustion of fuel rises significantly. In particular, as the size or volume of a combustor is reduced, there may be insufficient volume to allow the fuel to first be vaporized completely, burned efficiently, and then mixed uniformly.

In order to overcome the foregoing, a unique low cost annular combustor was developed as disclosed in commonly owned U.S. Pat. No. 4,794,754, issued Jan. 3, 1989. This annular combustor has proven to be well suited for its intended purpose, but it was desired to attempt to achieve greater thrust with a higher turbine inlet temperature while meeting the necessary size constraints and achieving the goal of ultralow cost for throw away missile applications. For this purpose, it was recognized that a new approach would be required to reach the necessary parameters of operation.

More specifically, the small missile application may typically be such as to require a spacing of one inch between combustor walls. It is also typically a necessary parameter that very difficult to burn missile fuel such as JP10 be handled efficiently even though such fuel is known to have a high carbon content together with very high surface tension and viscosity which, respectively, results in carbon buildup on the walls of the combustor together with a smoke filled exhaust and makes fuel atomization difficult which creates combustion inefficiency and flame instability problems. In very small combustors, such problems are oftentimes greatly magnified particularly where only low cost solutions are available.

In addition, such problems are exacerbated where high turbine inlet temperatures are to be found. This follows because only low cost means of cooling the metal at such high temperatures are acceptable, especially for small missile applications. In addition, the turbine inlet temperature distribution must be exceptionally uniform to avoid burnout of the turbine nozzle blades.

To achieve uniform turbine inlet temperature distribution in gas turbines having annular combustors, it has been necessary to provide a large number of fuel injectors to assure that the fuel is uniformly distributed in the combustion air about the annular combustor. Fuel injectors are, however, quite expensive with the consequence that the use of a large number of fuel injectors is not economically satisfactory. As the number of fuel injectors in a system is increased, particularly where there is to be unchanged fuel consumption, the fuel flow area in each injector necessarily becomes smaller and thus more prone to clogging.

When this occurs, the very problem addressed, i.e., nonuniform turbine inlet distribution, is exactly what results.

Furthermore, in relatively small turbine engines where relatively low fuel flow rates may be encountered, it is highly desirable to minimize the number of fuel injectors to minimize the possibility of clogging. To avoid this difficulty, the prior art has suggested that fuel be injected into annular combustion chambers with some sort of tangential component whereby the resulting swirl of fuel and combustion supporting gas provides a much more uniform mix of fuel with the air to provide a more uniform burn and thus achieve more circumferential uniformity in the turbine inlet temperature. However, this solution deals only with minimizing the presence of hot and/or cold spots while failing to focus on the remaining problem where gases of combustion may impinge upon components in a uniform manner but at excessive temperatures.

The present invention is directed to overcoming one or more of the above stated problems.

SUMMARY OF THE INVENTION

It is the principal object of the present invention to provide a new and improved annular combustor for a gas turbine wherein the annular combustor is characterized by meeting necessary performance parameters while utilizing an inexpensive construction. Still further, it is an object of the present invention to provide a new and improved annular combustor of unusually small volume which promotes both full and efficient vaporization and combustion of fuel along with thorough mixing for uniform exit temperatures to a turbine wheel. It is yet an additional object of the present invention to provide a new and improved annular combustor for a gas turbine wherein a flame zone is established entirely between a radially extending wall and the plane of a dilution air zone.

In an exemplary embodiment of an annular combustor for a gas turbine in accordance with the present invention, the combustor comprises a combustor housing including a generally axially extending sleeve and an annular liner disposed within the housing and about the sleeve. The liner has generally concentric inner and outer axially elongated walls spaced from the sleeve and the housing, respectively, and also has a radially extending wall spaced from the housing and interconnecting the inner and outer walls at one end to define a combustion chamber. The liner is spaced from the housing and the sleeve to define a compressed air flow path extending from a radially outer compressed air inlet in communication with a source of compressed air to a radially inner compressed air outlet in communication with the combustion chamber at a point axially remote from the radially extending wall. The combustor also includes fuel injection means preferably of the air blast type for injecting a fuel/air mixture into the liner in a generally tangential direction adjacent the radially extending wall. The combustor still further includes a plurality of open ended elongated tubes in the outer wall adjacent the compressed air inlet to provide dilution air at a point upstream of a turbine nozzle and a plurality of open ended elongated tubes in the outer wall intermediate the compressed air inlet and the radially extending wall to direct air for combustion into the combustion chamber in a generally tangential direction. With this arrangement, the combustion air tubes are sized to admit sufficient combustion air to ensure completion of combustion upstream of the plane defined by the dilution air tubes while forming a flame zone extending from a point adjacent the radially extending wall to a point no further downstream than the dilution air tubes.

In a preferred embodiment, the air blast fuel injection means includes a fuel injection tube extending into at least some of a plurality of open ended elongated air blast tubes in the outer wall directed generally tangentially of the combustion chamber in closely spaced relation to the radially extending wall. The combustion air tubes are also preferably directed generally tangentially of the combustion chamber at generally the same angle as the air blast tubes to produce swirl within the flame zone of the combustion chamber. In addition, the compressed air outlet is preferably in communication with the combustion chamber adjacent a turbine shroud to direct compressed air onto the turbine shroud upstream of the combustor outlet and turbine nozzle to cool and add dilution air.

In a highly preferred embodiment, means are provided for forming an air film including a plurality of tangential cooling strips on the inner surface of at least one of the inner, outer and radially extending walls. The air film forming means also includes a plurality of air entry holes admitting compressed air from the compressed air flow path into the combustion chamber along the tangential cooling strips to form the air film. Advantageously, the tangential cooling strips include a plurality of axially extending strips on the inner and outer walls and a plurality of radially extending strips on the radially extending wall.

With this arrangement, the tangential cooling strips all direct air in the same direction as the direction of swirl within the flame zone of the combustion chamber.

Other objects, advantages and features of the present invention will become apparent from a consideration of the following specification taken in conjunction with the accompanying drawings.

DETAILED DESCRIPTION OF THE PREFERRED EMBODIMENT

Figure 1:
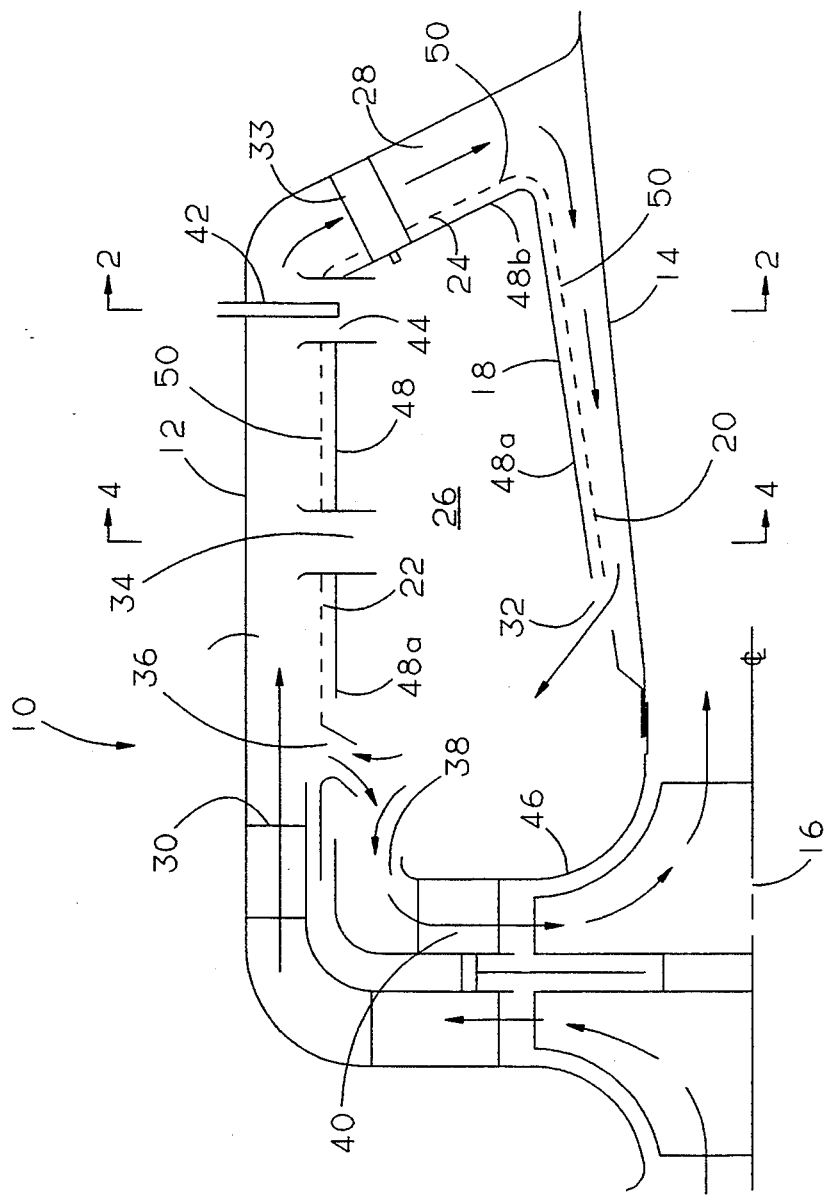
FIG. 1 is a somewhat schematic, fragmentary, sectional view of an annular combustor in accordance with the present invention.

Referring to the drawings, and first to FIG. 1, the reference numeral 10 designates generally an annular combustor for a gas turbine in accordance with the present invention. The combustor 10 comprises a combustor housing 12 including a generally axially extending sleeve 14 having an axis 16 and an annular liner generally designated 18 disposed within the housing 12 and about the sleeve 14. The liner 18 has generally concentric inner and outer axially elongated walls 20 and 22 spaced from the sleeve 14 and housing 12, respectively, and also has a generally radially extending wall 24 spaced from the housing 12 and interconnecting the inner and outer walls 20 and 22 at one end to define a combustion chamber 26. The liner 18 is spaced from the housing 12 and the sleeve 14 to define a compressed air flow path 28 extending from a radially outer compressed air inlet 30 in communication with a source of compressed air to a radially inner compressed air outlet 32 in communication with the combustion chamber 26 at a point axially remote from the radially extending wall 24. The combustor 10 also includes fuel injection means preferably of the air blast type for injecting a fuel/air mixture into the liner 18 in a generally tangential direction adjacent the radially extending wall 24 to be ignited by means of an igniter 33. With this construction, the combustor 10 further includes a plurality of open ended elongated tubes 34 in the outer wall 22 intermediate the compressed air inlet 30 and the radially extending wall 24 and a plurality of openings which may suitably comprise open ended elongated tubes 36 in the outer wall 22 adjacent the compressed air inlet 30.

Still referring to FIG. 1, the tubes 36 are generally disposed in a plane transverse to the axis 16. It will also be seen that the tubes 36 are generally directed angularly toward a combustor outlet 38 at the end of the combustion chamber 26 remote from the radially extending wall 24. As a result, the tubes 36 are adapted to provide dilution air at a point upstream of a turbine nozzle 40.

Also as shown in FIG. 1, the tubes 34 are generally disposed in a plane transverse to the axis 16 and are in communication with the compressed air flow path 28. Moreover, and as will be appreciated from FIG. 4, the tubes 34 direct air for combustion into the combustion chamber 26 in a generally tangential direction.

In this connection, the combustion air tubes 34 are sized so as to admit sufficient combustion air to ensure completion of combustion within the combustion chamber 26 upstream of the plane defined by the dilution air tubes 36. Thus, the combustion air tubes 34 cooperate with the air blast fuel injection means as will be described hereinafter to form a flame zone extending from a point adjacent the radially extending wall 24 to a point no further downstream than the dilution air tubes 36. In this manner, the annular combustor 10 may be of a significantly reduced length compared to conventional combustors while achieving the objective of providing uniform turbine inlet temperature.

More specifically, the flame zone occupies substantially the entire region from the radially extending wall 24 to the plane of the dilution air tubes 36. Thus, there is no wasted axial length in the annular combustor 10 or for that matter in the gas turbine engine in which it is used. For this reason, the positioning of the air blast fuel injection means, combustion air tubes 34 and dilution air tubes 36 achieves a most advantageous result.

Figure 2:
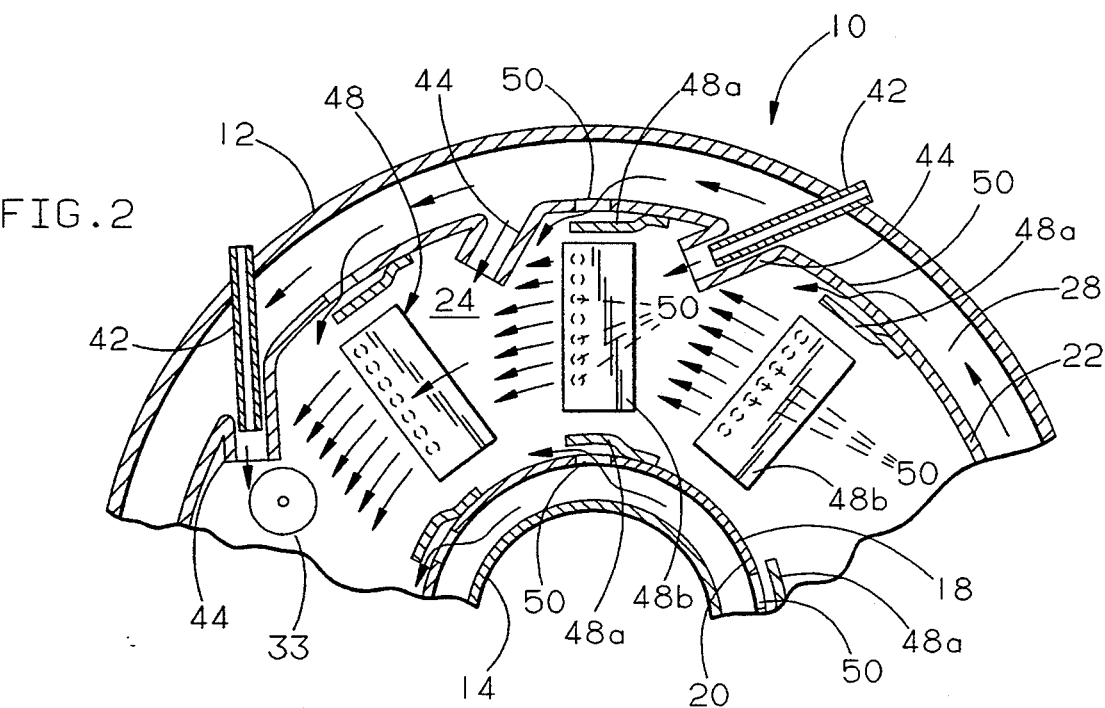
FIG. 2 is a fragmentary, enlarged sectional view taken on the line 2—2 of FIG. 1.

Referring to FIGS. 1 and 2, the air blast fuel injection means includes a fuel injection tube 42 extending into at least some of a plurality of open ended elongated air blast tubes 44 in the outer wall 22. The air blast tubes 44 are directed generally tangentially of the combustion chamber 26 in a plane transverse to the axis 16 in closely spaced relation to the radially extending wall 24 (compare FIGS. 1 and 2). With this arrangement, and comparing FIGS. 2 and 4, the combustion air tubes 34 are also directed generally tangentially of the combustion chamber 26 at generally the same angle as the air blast tubes 44 to produce swirl within the flame zone.

While the air blast fuel injection means has been disclosed herein, it will be appreciated that other fuel injection means may also be suitable. Thus, for instance, a finger fuel injector wherein fuel and/or air impact on a finger or impingement surface such as that disclosed in commonly owned and copending U.S. patent application Ser. No. 133,491, filed Dec. 14, 1987, may be employed. Accordingly, the teachings of this patent application are incorporated herein by reference.

Referring once again to FIG. 1, the compressed air outlet 32 is in communication with the combustion chamber 26 adjacent a turbine shroud 46. The turbine shroud 46 and the outer wall 22 together define the combustor outlet 38 leading to the turbine nozzle 40. As shown, the compressed air outlet 32 directs compressed air onto the turbine shroud 46 upstream of the combustor outlet 38 and turbine nozzle 40.

Figure 3:
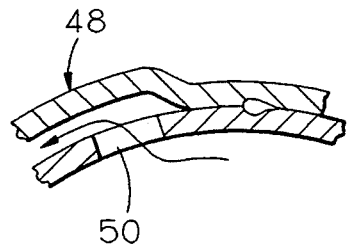
FIG. 3 is a fragmentary, enlarged sectional view of a cooling strip that may be utilized in accordance with the present invention.

Referring to FIGS. 1 through 3, means are provided for forming an air film including a plurality of tangential cooling strips generally designated 48 on the inner surface of at least one of the inner, outer and radially extending walls. It will also be appreciated that a plurality of air entry holes 50 admit compressed air from the compressed air flow path 28 into the combustion chamber 26 along the tangential cooling strips 48 to form the air film. In the illustrated embodiment, there are axially extending strips 48a on the inner and outer walls 20 and 22 and radially extending strips 48b on the radially extending wall 24 all directing air in the same direction as the direction of swirl within the flame zone of the combustion chamber 26.

As best shown in FIG. 2, each of the air blast tubes 44 has one end located within the combustion chamber 26 and the other end open to the space between the outer wall 20 and the housing 12. The one end of each of the tubes 44 is disposed closely adjacent the radially extending wall 24 (see FIG. 1) and the other end of each of the tubes 44 is in communication with the compressed air flow path 28. In the illustrated embodiment, one of the fuel injection tubes 42 extends into every other one of the air blast tubes 44 in generally coaxial relation thereto although other arrangements are also contemplated.

Figure 4:
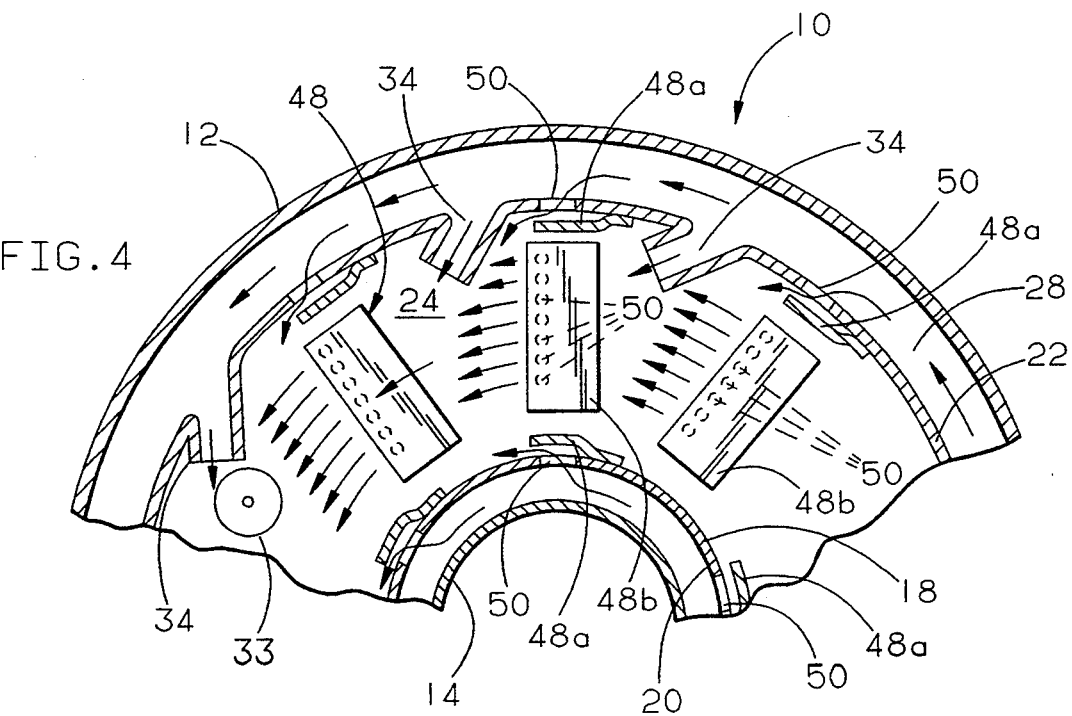
FIG. 4 is a fragmentary, enlarged sectional view taken on the line 4—4 of FIG. 1.

Referring to FIGS. 1 and 4, the combustion air tubes 34 also each have one end located within the combustion chamber 26 and the other end in communication with the compressed air flow path 28. As previously mentioned, the combustion air tubes 34 are directed at generally the same angle as the air blast tubes 44. More specifically, the one end of each of the combustion air tubes 34 located within the combustion chamber 26 is directed at generally the same angle as the corresponding ends of the air blast tubes 44 to produce swirl within the flame zone of the combustion chamber 26.

In like fashion, the dilution air tubes 36 each have one end located within the combustion chamber 26 and the other end in communication with the compressed air flow path 28. As previously suggested, the dilution air tubes 36 are directed at an angle toward the combustor outlet 38 at the upstream end of the flame zone to provide dilution air at a point upstream of the turbine nozzle 40.

In the illustrated embodiment, the length of the flame zone is defined by the distance from the center line of the air blast tubes 44 to the plane of entry of dilution air from the dilution air tubes 36. The combustion air tubes 34 are advantageously located midway of the flame zone for introducing combustion air swirling in the same direction of swirl and at approximately the same angle as air passing through the air blast tubes 44. For different applications, the air flow through the combustion air tubes 34 can be adjusted to ensure complete combustion at least by the plane of dilution air entry.

As a result, a considerable improvement in terms of space utilization has been achieved. Thus, more air and more fuel can be brought into the combustion chamber 26 to achieve greater power output. On the other hand, the combustor can be shortened as previously described.

With the annular combustor 10 of the present invention, the tangential air blast jets immediately start swirl in a helical fashion towards the turbine nozzle 40. This makes it possible to avoid any wasted length since the path of swirl provides a sufficiently long path through the flame zone before entry into the combustor outlet 38. As will be appreciated, this aspect of the present invention represents a significant improvement in annular combustors.

While in the foregoing there has been set forth a preferred embodiment of the invention, it will be appreciated that the details herein given may be varied by those skilled in the art without departing from the true spirit and scope of the appended claims.

I claim:

1. An annular combustor for a gas turbine, comprising:
 a combustor housing including a generally axially extending sleeve having an axis;
 an annular liner disposed within said housing and about said sleeve and having generally concentric inner and outer axially elongated walls, said inner and outer walls of said liner being spaced from said sleeve and said housing, respectively, said liner also having a generally radially extending wall spaced from said housing and interconnecting said inner and outer walls at one end to define a combustion chamber;
 said liner being spaced from said housing and said sleeve to define a compressed air flow path, said compressed air flow path extending from a radially outer compressed air inlet in communication with a source of compressed air to a radially inner compressed air outlet in communication with said combustion chamber, said compressed air outlet being axially remote from said radially extending wall;
 fuel injection means for injecting a fuel/air mixture into said liner in a generally tangential direction adjacent said radially extending wall;
 a plurality of openings in said outer wall adjacent said compressed air inlet, said openings generally being disposed in a plane transverse to said axis and being directed toward a combustor outlet at the end of said combustion chamber remote from said radially extending wall, said openings being adapted to provide dilution air at a point upstream of a turbine nozzle;

a plurality of open ended elongated tubes in said outer wall intermediate said dilution air openings and said radially extending wall, said tubes being generally disposed in a plane transverse to said axis, said tubes communicating with said compressed air flow path so as to direct air for combustion into said combustion chamber in a generally tangential direction;

said combustion air tubes being sized to admit sufficient combustion air to ensure completion of combustion upstream of said plane defined by said dilution air openings while forming a flame zone extending from a point adjacent said radially extending wall to a point no further downstream than said dilution air openings; and means for igniting a mixture of fuel and air within said combustion chamber.

2. The annular combustor of claim 1 wherein said fuel injection means includes a fuel injection tube extending into at least some of a plurality of open ended elongated air blast tubes in said outer wall, said air blast tubes being directed generally tangentially of said combustion chamber in a plane transverse to said axis in closely spaced relation to said radially extending wall.

3. The annular combustor of claim 2 wherein said combustion air tubes intermediate said dilution air openings and said radially extending wall are directed generally tangentially of said combustion chamber at generally the same angle as said air blast tubes of said fuel injection means to produce swirl within said flame zone of said combustion chamber.

4. The annular combustor of claim 1 wherein said compressed air outlet is in communication with said combustion chamber adjacent a turbine shroud, said turbine shroud and said outer wall together defining said combustor outlet leading to said turbine nozzle, said compressed air outlet directing compressed air onto said turbine shroud upstream of said combustor outlet and turbine nozzle.

5. The annular combustor of claim 1 including means for forming an air film including a plurality of tangential cooling strips on the inner surface of at least one of said inner, outer and radially extending walls and a plurality of air entry holes admitting compressed air from said compressed air flow path into said combustion chamber along said tangential cooling strips to form said air film.

6. An annular combustor for a gas turbine, comprising:

a combustor housing including a generally axially extending sleeve having an axis;

an annular liner disposed within said housing and about said sleeve and having generally concentric inner and outer axially elongated walls, said inner and outer walls of said liner being spaced from said sleeve and said housing, respectively, said liner also having a generally radially extending wall spaced from said housing and interconnecting said inner and outer walls at one end to define a combustion chamber;

said liner being spaced from said housing and said sleeve to define a compressed air flow path, said compressed air flow path extending from a radially outer compressed air inlet in communication with a source of compressed air to a radially inner compressed air outlet in communication with said combustion chamber, said compressed air outlet being axially remote from said radially extending wall;

said liner including means for forming an air film on the inner surfaces of said inner, outer and radially extending walls;

air blast fuel injection means for injecting a fuel/air mixture into said liner in a generally tangential direction adjacent said radially extending wall in a plane transverse to said axis;

said fuel injection means including a plurality of open ended elongated air blast tubes in said outer wall, said air blast tubes being disposed in closely spaced parallel relation to said radially extending wall, said air blast tubes being directed generally tangentially of said combustion chamber;

each of said air blast tubes having one end located within said combustion chamber and the other end open to the space between said outer wall and said housing, said one end of each of said tubes being disposed closely adjacent said radially extending wall and said other end of each of said tubes being in communication with said compressed air flow path, at least some of said air blast tubes having a fuel injection tube extending into said air blast tube for injecting fuel into said combustion chamber;

a plurality of open ended elongated tubes in said outer wall adjacent said compressed air inlet, said tubes generally being disposed in a plane transverse to said axis and directed toward a combustor outlet at the end of said combustion chamber remote from said radially extending wall, said tubes being adapted to provide dilution air at a point upstream of a turbine nozzle;

a plurality of open ended elongated tubes in said outer wall intermediate said dilution air tubes and said radially extending wall, said tubes being disposed in a plane transverse to said axis, said tubes communicating with said compressed air flow path to direct air for combustion into said combustion chamber in a generally tangential direction;

said combustion air tubes being sized to admit sufficient combustion air to ensure completion of combustion upstream of said plane defined by said dilution air tubes while forming a flame zone extending from a point adjacent said radially extending wall to a point no further downstream than said dilution air tubes; and means for igniting a mixture of fuel and air within said combustion chamber.

7. The annular combustor of claim 6 wherein said combustion air tubes intermediate said dilution air tubes and said radially extending wall each are directed generally tangentially of said combustion chamber at generally the same angle as said air blast tubes of said fuel injection means to produce swirl within said flame zone of said combustion chamber.

8. The annular combustor of claim 6 wherein said combustion air tubes each have one end located within said combustion chamber and the other end in communication with said compressed air flow path, said one end of each of said combustion air tubes being directed at generally the same angle as said air blast tubes to produce swirl within said flame zone of said combustion chamber.

9. The annular combustor of claim 6 wherein said dilution air tubes each have one end located within said combustion chamber and the other end in communication with said compressed air flow path, said dilution air tubes being directed toward said combustor outlet at the upstream end of said flame zone to provide dilution air at a point upstream of said turbine nozzle.

10. The annular combustor of claim 6 wherein said compressed air outlet is in communication with said combustion chamber adjacent a turbine shroud, said turbine shroud and said outer wall together defining said combustor outlet leading to said turbine nozzle, said compressed air outlet directing compressed air onto said turbine shroud upstream of said combustor outlet and turbine nozzle.

11. The annular combustor of claim 6 wherein said air film forming means includes a plurality of tangential cooling strips on the inner surface of said inner, outer and radially extending walls and a plurality of air entry holes admitting compressed air from said compressed air flow path into said combustor along each of said tangential cooling strips to form an air film on each of said walls.

12. An annular combustor for a gas turbine, comprising:
   a combustor housing including a generally axially extending sleeve having an axis;
   an annular liner disposed within said housing and about said sleeve and having generally concentric inner and outer axially elongated walls, said inner and outer walls of said liner being spaced from said sleeve and said housing, respectively, said liner also having a generally radially extending wall spaced from said housing and interconnecting said inner and outer walls at one end to define a combustion chamber;
   said liner being spaced from said housing and said sleeve to define a compressed air flow path, said compressed air flow path extending from a radially outer compressed air inlet in communication with a source of compressed air to a radially inner compressed air outlet in communication with said combustion chamber, said compressed air outlet being axially remote from said radially extending wall;
   said liner including means for forming an air film on the inner surfaces of said inner, outer and radially extending walls, said air film forming means including a plurality of tangential cooling strips on the inner surface of said inner, outer and radially extending walls and a plurality of air entry holes admitting compressed air from said compressed air flow path into said combustor, said compressed air being directed by said tangential cooling strips to form an air film on each of said walls;
   air blast fuel injection means for injecting a fuel/air mixture into said liner in a generally tangential direction adjacent said radially extending wall in a plane transverse to said axis;
   said fuel injection means including a plurality of open ended elongated air blast tubes in said outer wall, said air blast tubes being disposed in closely spaced parallel relation to radially extending wall, said air blast tubes being directed generally tangentially of said combustion chamber;
   each of said air blast tubes having one end located within said combustion chamber and the other end open to the space between said outer wall and said housing, said one end of each of said tubes being disposed closely adjacent said radially extending wall and said other end of each of said tubes being in communication with said compressed air flow path, at least some of said air blast tubes having a fuel injection tube extending into said air blast tube for injecting fuel into said combustion chamber;
   a plurality of open ended elongated tubes in said outer wall adjacent said compressed air inlet, said tubes generally being disposed in a plane transverse to said axis and directed toward a combustor outlet at the end of said combustion chamber remote from said radially extending wall, said tubes being adapted to provide dilution air at a point upstream of a turbine nozzle;
   a plurality of open ended elongated tubes in said outer wall intermediate said dilution air tubes and said radially extending wall, said tubes being disposed in a plane transverse to said axis, said tubes communicating with said compressed air flow path to direct air for combustion into said combustion chamber in a generally tangential direction;
   said combustion air tubes being sized to admit sufficient combustion air to ensure completion of combustion upstream of said plane defined by said dilution air tubes while forming a flame zone extending from a point adjacent said radially extending wall to a point no further downstream than said dilution air tubes;
   said plane of said combustion air tubes is disposed midway between said plane of said air blast fuel injection means and said plane of said dilution air tubes; and
   means for igniting a mixture of fuel and air within said combustion chamber.

13. The annular combustor of claim 12 wherein said combustion air tubes intermediate said dilution air tubes and said radially extending wall each are directed generally tangentially of said combustion chamber at generally the same angle as said air blast tubes of said fuel injection means to produce swirl within said flame zone of said combustion chamber.

14. The annular combustor of claim 12 wherein said combustion air tubes each have one end located within said combustion chamber and the other end in communication with said compressed air flow path, said one end of each of said combustion air tubes being directed at generally the same angle as said air blast tubes to produce swirl within said flame zone of said combustion chamber.

15. The annular combustor of claim 12 wherein said dilution air tubes each have one end located within said combustion chamber and the other end in communication with said compressed air flow path, said dilution air tubes being directed toward said combustor outlet at the upstream end of said flame zone to provide dilution air at a point upstream of said turbine nozzle.

16. The annular combustor of claim 12 wherein said compressed air outlet is in communication with said combustion chamber adjacent a turbine shroud, said turbine shroud and said outer wall together defining said combustor outlet leading to said turbine nozzle, said compressed air outlet directing compressed air onto said turbine shroud upstream of said combustor outlet and turbine nozzle.

17. The annular combustor of claim 12 wherein said tangential cooling strips include a plurality of axially extending strips on said inner and outer walls and a plurality of radially extending strips on said radially extending wall all directing air in the same direction as the direction of swirl within said flame zone of said combustion chamber.

18. The annular combustor of claim 12 wherein one of said fuel injection tubes extends into every other one of said air blast tubes in generally coaxial relation thereto.

* * * * *